United States Patent
Lim et al.

(10) Patent No.: US 8,194,357 B2
(45) Date of Patent: Jun. 5, 2012

(54) HARD DISK DRIVE

(75) Inventors: Hong Taek Lim, Suwon-si (KR); Ki Tag Jeong, Hwaseong-si (KR)

(73) Assignee: Seagate Technology International

( * ) Notice: Subject to any disclaimer, the term of this patent is extended or adjusted under 35 U.S.C. 154(b) by 670 days.

(21) Appl. No.: 12/356,605

(22) Filed: Jan. 21, 2009

(65) Prior Publication Data

US 2009/0190265 A1  Jul. 30, 2009

(30) Foreign Application Priority Data

Jan. 25, 2008 (KR) ........................ 10-2008-0007857

(51) Int. Cl.
*G11B 5/55* (2006.01)
(52) U.S. Cl. ................. 360/264.7; 360/97.02; 360/264.8
(58) Field of Classification Search ............... 360/264.7, 360/264.8, 264.3, 265, 97.01, 97.02, 256.2
See application file for complete search history.

(56) References Cited

U.S. PATENT DOCUMENTS

| 6,125,016 | A * | 9/2000 | Lin ........................... | 360/264.8 |
| 6,304,421 | B1 * | 10/2001 | Brown ....................... | 360/264.8 |
| 2003/0081354 | A1 * | 5/2003 | Ooi et al. .................. | 360/256.2 |
| 2005/0162782 | A1 * | 7/2005 | Tsuda et al. ............... | 360/264.7 |

FOREIGN PATENT DOCUMENTS

| JP | 2000-067571 | 3/2000 |
| JP | 2004-055063 | 2/2004 |
| JP | 2005-285154 | 10/2005 |
| KR | 2001-0084547 | 9/2001 |

* cited by examiner

*Primary Examiner* — Gene Auduong

(57) ABSTRACT

A hard disk drive (HDD) includes a base including a voice coil motor (VCM) which drives an actuator, a cover combined with an upper surface of the base, and a magnetic leakage flux reducer adjacent to the VCM to reduce a magnetic leakage flux leaked from the VCM. Therefore, the HDD includes a simple structure to be made light and reduces the magnetic leakage flux which affects the VCM.

16 Claims, 5 Drawing Sheets

FIG. 4

| MATERIAL | SPCE | A1 | Diff. [%] |
|---|---|---|---|
| MAX. [g] | 8.3265 | 2.8974 | 65.20266619 |
| MIN. [g] | 8.0849 | 2.8728 | 64.46709298 |

FIG. 5

| SPCE | AL | AL + Laminated Plate |
|---|---|---|
| 140G | 860G | 290G |

HARD DISK DRIVE

CROSS-REFERENCE TO RELATED APPLICATIONS

This application claims the priority of Korean Patent Application No. 10-2008-0007857, filed on Jan. 25, 2008, in the Korean Intellectual Property Office, the disclosure of which is incorporated herein by reference.

BACKGROUND OF THE INVENTION

1. Field of the Invention

The present general inventive concept relates to a hard disk drive (HDD), and more particularly, to a HDD which includes a simple structure to be made light and is capable of reducing a magnetic leakage flux which affects a voice coil motor (VCM).

2. Description of the Related Art

Hard disk drives (HDDs) write data on and/or read data from disks using read and/or write heads. Since the HDDs are also capable of accessing mass data at a high speed, they are widely used as secondary memory units, etc., of computer systems.

Such HDDs have had high capacities and have expanded their applications due to the realization of high Tracks Per Inch (TPI) and Bits Per Inch (BTI).

Therefore, there have been briskly developed small HDDs which are to be used in portable electronic products, including notebook computers, personal digital assistants (PDAs), portable phones, etc. 2.5-inch HDDs have been developed and used in notebook computers, etc. Additionally, 0.85-inch HDDs having sizes similar to the size of coins have been briskly studied and developed. Such 0.85-inch HDDS have been used or are expected to be used in portable phones, MEPG Audio Layer-3s (MP3s), or the like.

Such a HDD includes a plurality of parts related to reading and writing of information, e.g., a disk, a base on which a head stack assembly (HSA) having a voice coil motor (VCM), etc., are installed, and a cover which is combined with an upper surface of the base.

In the case of a small form factor HDD (SFF HDD) having a diameter of 1.8 inch or less, a cover is mainly formed of a SPCE (Cold Rolled Steel) or steel use stainless (SUS). In this case, the cover may be easily pressed and have a rigidity in contradistinction to thickness. In particular, the cover may greatly reduce a leakage of a magnetic flux which affects the VCM.

However, if the cover is formed of the SPCE (Cold Rolled Steel), the cover is heavier than when it is formed of a nonferrous material. This does not satisfy an object of the SFF HDD to be made light in weight.

Accordingly, there may be considered a method of forming a cover of a nonferrous material instead of a SPCE (Cold Rolled Steel) in order to reduce a weight of the cover. However, if the cover is formed of the nonferrous material only to reduce the weight, a magnetic leakage flux may greatly affect a VCM of the SFF HDD. Therefore, the cover should be improved such that a structure thereof meets requirements of an SFF HDD to reduce the magnetic leakage flux affecting the VCM and to be made light in weight.

SUMMARY OF THE INVENTION

The present inventive concept provides a hard disk drive (HDD) which includes a simple structure to be made light in weight and is capable of reducing a magnetic leakage flux which affects a voice coil motor (VCM).

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a hard disk drive (HDD) including: a base including a voice coil motor (VCM) which drives an actuator; a cover combined with an upper surface of the base; and a magnetic leakage flux reducer adjacent to the VCM to reduce a magnetic leakage flux leaked from the VCM.

The cover may be formed of a nonferrous material.

The cover may be formed of an aluminum material.

The magnetic leakage flux reducer may be formed of a steel material.

The VCM may include: a bobbin which forms an end of a head stack assembly (HSA) pivoting on a pivot shaft and on which a voice coil is turned; a pair of magnets which can be disposed under and above the bobbin so that the bobbin is positioned between the magnets, to have different magnetic poles so as to generate a magnetic field which interacts with an electric field generated by the VCM; and upper and lower motor casings which are combined with the magnets, wherein the magnetic leakage flux reducer is a laminate plate which is stacked on an upper surface of the upper motor casing.

The magnetic leakage flux reducer may be substantially formed in the same shape as the upper surface of the upper motor casing.

The magnetic leakage flux reducer may be adhered onto an upper surface of the VCM.

The magnetic leakage flux reducer may be combined with an inner surface of the cover.

The magnetic leakage flux reducer may be substantially formed in the same shape as the upper surface of the upper motor casing.

The cover and the magnetic leakage flux reducer may be formed into a single body using a double molding method.

The HDD may be a small form factor HDD (SFF HDD) having a diameter of 1.8 inch or less.

According to the present general inventive concept, the HDD may include a simple structure to be made light and reduce the magnetic leakage flux which affects the VCM.

The foregoing and/or other aspects and utilities of the present general inventive concept can also be achieved by providing a hard disk drive (HDD) including a base including a voice coil motor (VCM) which drives an actuator and a cover connected to an upper surface of the base, the cover including a magnetic leakage flux reducer molded together with the cover at a position adjacent to the VCM to prevent a magnetic flux from leaking from the VCM.

The foregoing and/or other aspects and utilities of the present general inventive concept can also be achieved by providing a hard disk drive (HDD) including a base including a voice coil motor (VCM) which drives an actuator and a cover connected to an upper surface of the base, the cover including a first material of light weight to connect with the base and a second material disposed at a position adjacent to the VCM to prevent a magnetic flux from leaking from the VCM.

BRIEF DESCRIPTION OF THE DRAWINGS

The above and/or other aspects and advantages of the present general inventive concept will become apparent and more readily appreciated from the following detailed description, taken in conjunction with the accompanying drawings of which:

FIG. 4 is a table comparing a mass of a cover of the present general inventive concept with a mass of a conventional cover; and FIG. 5 is a table comparing a magnetic leakage flux generated from a HDD of the present general inventive concept with a magnetic leakage flux generated from a conventional HDD.

DETAILED DESCRIPTION OF THE PREFERRED EMBODIMENTS

Figure 1:
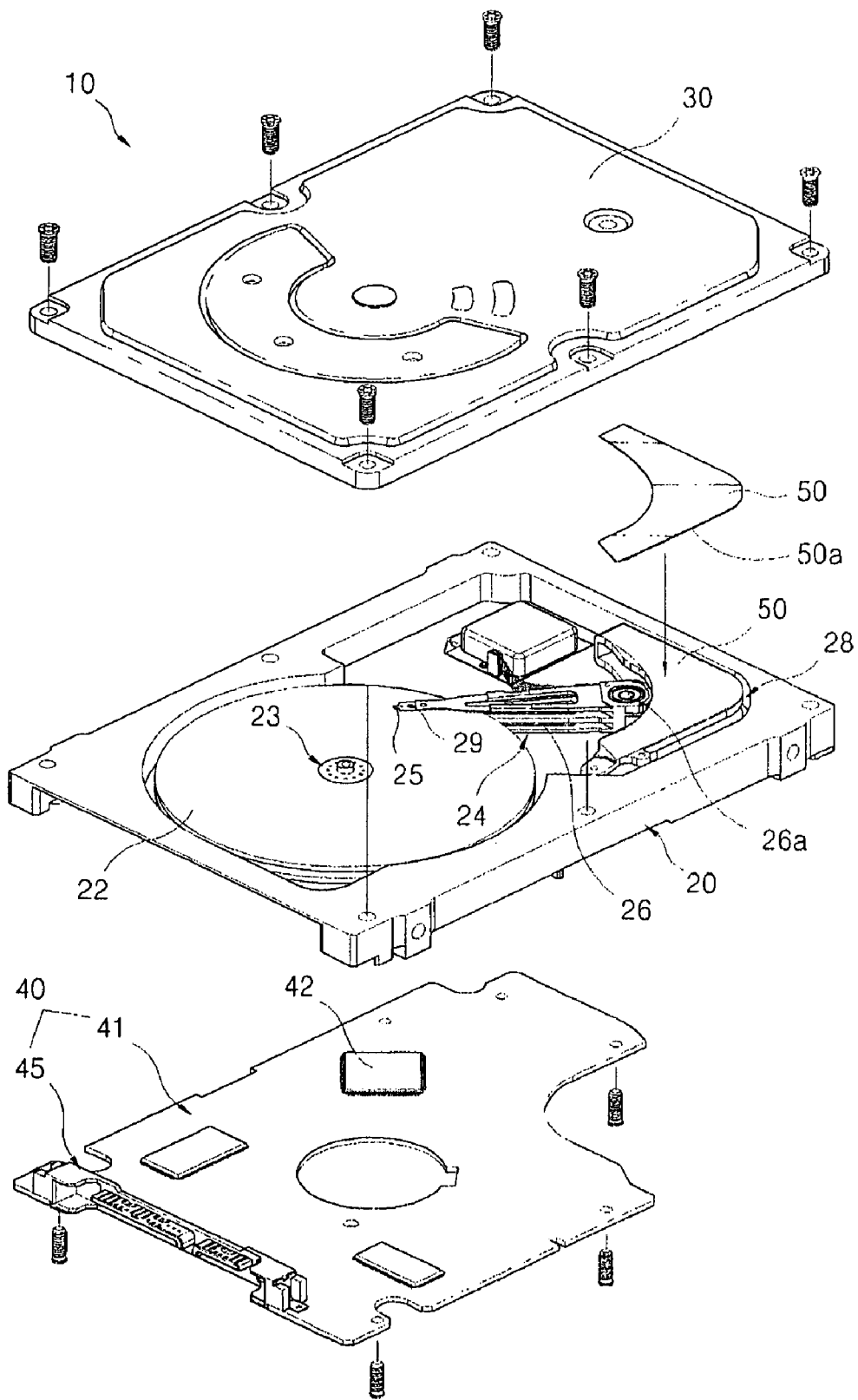
FIG. 1 is an exploded perspective view of a hard disk drive (HDD) according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The attached drawings illustrating preferred embodiments of the present general inventive concept are referred to in order to gain a sufficient understanding of the present general inventive concept, the merits thereof, and the objectives accomplished by the implementation of the present general inventive concept.

Hereinafter, the present general inventive concept will be described in detail by explaining preferred embodiments thereof with reference to the attached drawings. Like reference numerals in the drawings denote like elements.

Figure 2:
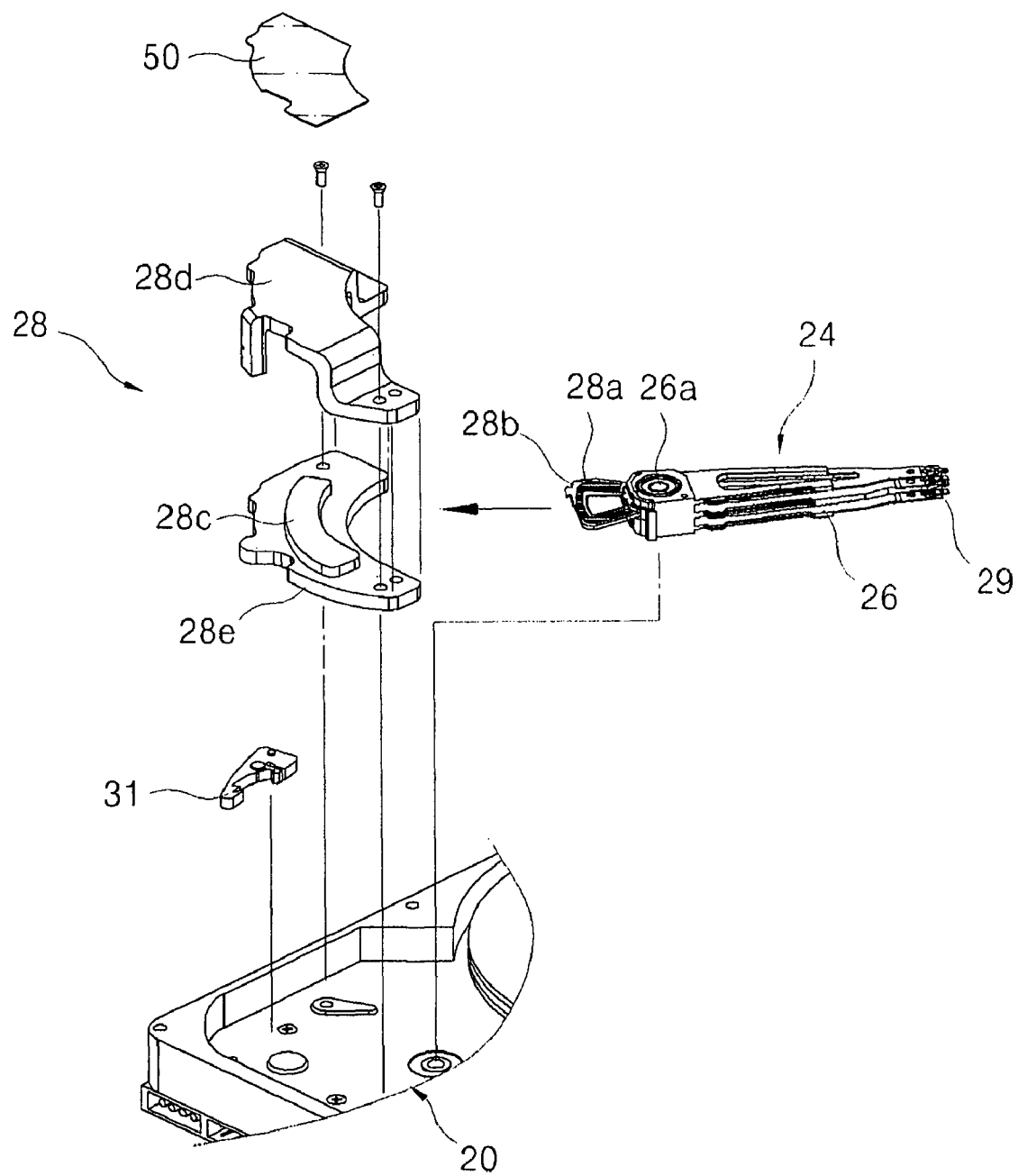
FIG. 2 is an enlarged view of a voice coil motor (VCM) zone of FIG. 1.
Figure 3:
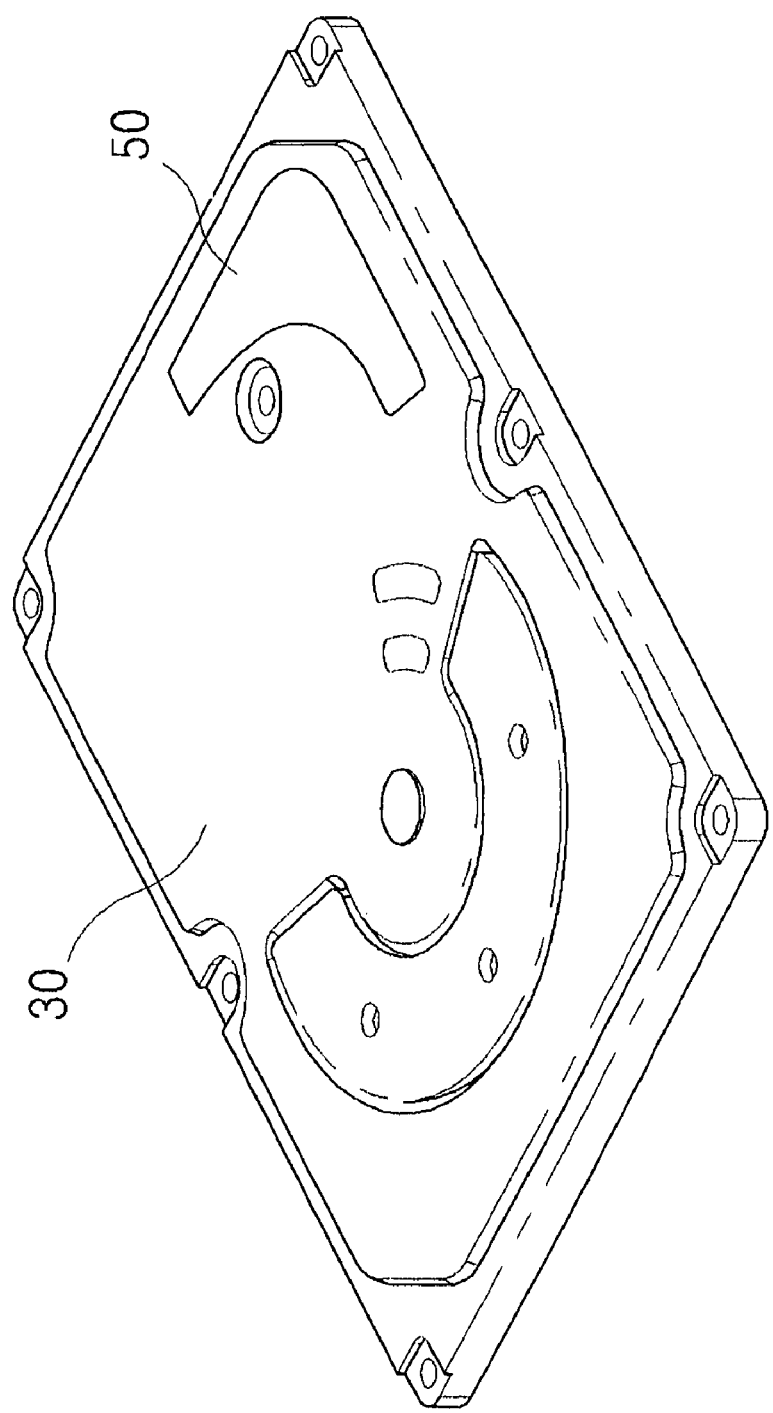
FIG. 3 is an enlarged view of a cover of FIG. 1.
Figure 5:
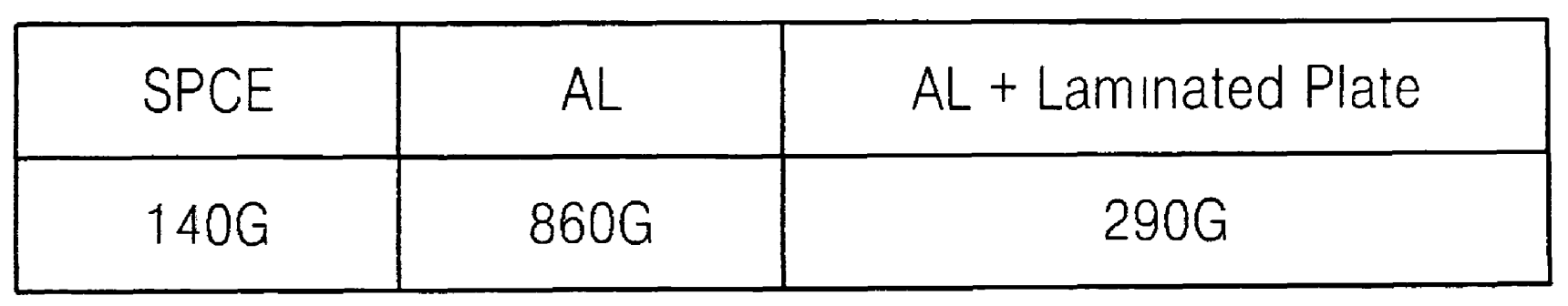

FIG. 1 is an exploded perspective view of a hard disk drive (HDD) according to an embodiment of the present general inventive concept. FIG. 2 is an enlarged view of a voice coil motor (VCM) zone of FIG. 1. FIG. 3 is an enlarged view of a cover of FIG. 1. FIG. 4 is a table comparing a mass of a cover of the present general inventive concept with a mass of a conventional cover. FIG. 5 is a table comparing a magnetic leakage flux generated from a HDD of the present general inventive concept with a magnetic leakage flux generated from a conventional HDD.

Referring to FIG. 1, a HDD 10 of the present embodiment includes a base 20, a printed circuit board assembly (PCBA) 40 which is combined with a lower part of the base 20, and a cover 30 which is combined with an upper surface of the base 20.

The base 20 may be formed of a steel-based material, and a plurality of internal parts (not shown) related to reading and writing of information are installed on the base 20. In other words, at least one disk 22 on which data is written and stored, a spindle motor 23, a head stack assembly (HSA) 24, etc., are installed on the base 20. The spindle motor 23 is installed in a central zone of the disk 22 to rotate the disk 22, and the HSA 24 moves toward and away from the disk 22 based on the operation status of the HDD.

Since the HDD 100 of the present embodiment is a small form factor HDD (SFF HDD), the disk 22 has a diameter of 1.8 inch. However, the present general inventive concept is not limited thereto and thus may be applied to an SFF HDD including a disk having a diameter equal to or less than 1.8 inch, i.e., a diameter of 1.3 inch or 0.08 inch.

The HSA 24 includes a magnetic head 25 which is used to write data on and/or read data from the disk 22 and an actuator 26 which flies the magnetic head 25 so that the magnetic head 25 accesses the data written on the disk 22.

The magnetic head 25 is installed at an end of a head gimbal 29 which extends from and is connected to the actuator 26. Thus, the magnetic head 25 is raised by an air stream formed above a surface of the disk 22 due to high-speed rotations of a plurality of disks 22. As a result, the magnetic head 25 flies while keeping a minute gap with the surface of the disk 22.

The actuator 26 pivots on a pivot shaft 26a above the disk 22. In other words, the actuator 26 moves to left and right due to an operation of a VCM 28 to radially move the magnetic head 25 above the disk 22 so as to write data to and/or read data from tracks of the disk 22, wherein the VCM 28 is installed at an end of the actuator 26, and the magnetic head 25 is installed at an other end of the actuator 26 opposite to the end at which the VCM 28 is installed.

Although not shown in FIG. 1, a latch 31 is installed under the VCM 28 as shown in FIG. 2 to elastically support the actuator 26 so as to prevent the actuator 26 from arbitrarily moving when the magnetic head 25 is parked in a parking zone of the disk 22. If an additional ramp is installed, the magnetic head 25 is parked at the additional ramp. In this case, the parking zone is excluded from the disk 22.

The VCM 28 will now be described in more detail with reference to FIG. 2. As shown in FIG. 2, the VCM 28 includes a bobbin 28b, a pair of magnets 28c, and motor casings 28d and 28e. The bobbin 28b forms an end of the HSA 24 which pivots on the pivot shaft 26a, and a voice coil 28a is turned on the bobbin 28b. The magnets 28c are respectively disposed above and below the bobbin 28b so that the bobbin 28b is positioned between the magnets 28c, to have different magnetic poles so as to generate a magnetic field which interacts with an electric field formed by the voice coil 28a. The motor casings 28d and 28e are combined with the magnets 28c.

The motor casings 28d and 28e are respectively classified into upper and lower casings 28d and 28e according to their positions. The latch 31 is installed under the lower motor casing 28e.

The PCBA 40 includes a printed circuit board (PCB) 41 on which a plurality of circuit parts are installed and a plug 45 which is combined with a side of the PCB 41. A plurality of circuit parts, i.e., controllers 42, are installed on a board surface of the PCB 41 to control various operations of the HDD 10. Also, memories (not shown) are installed around the controllers 42 to store various types of data or tables, etc.

The cover 30 is combined with an upper opening of the base 20 to protect the above-described parts together with the base 20.

In the present embodiment, the base 20 is formed of steel or a steel-based material, while the cover 30 is formed of a nonferrous material. In particular, the cover 30 is formed of an aluminum material of nonferrous materials.

In the present embodiment, since the HDD 10 is the SFF HDD which is to be made light, the cover 30 is formed of the aluminum material. Of nonferrous materials, the aluminum material has high rigidity in contradistinction to weight and is easily manufactured.

If the cover 30 is formed of the aluminum material as in the present embodiment, a mass of the cover 30 is reduced by about 65% as shown in FIG. 4. In FIG. 4, a SPCE (Cold Rolled Steel) refers to a SPCE of which a conventional cover (not shown) is formed.

Since the cover 30 is formed of the aluminum material, which is the nonferrous material, not the steel-based material, a weight of the HDD 10 becomes light.

However, if the cover 30 is formed of the aluminum material which is a nonferrous material, a large amount of magnetic flux may be leaked from the VCM 28 due to a physical property of aluminum.

In other words, a magnetic flux generated by the magnets 28c of the VCM 28 shown in FIG. 2 is easily leaked through the cover 30. If a magnetic leakage flux from the VCM 28 is great, the actuator 26 does not stably operate. Thus, the magnetic leakage flux may have a bad effect on a quality of the HDD 10.

In the present embodiment, a magnetic leakage flux reducer 50 is installed to be adjacent to the VCM 28 so as to reduce the magnetic leakage flux which affects the VCM 28.

As described above, the magnetic leakage flux reducer 50 is installed, and the cover 30 is formed of the aluminum material which is the nonferrous material. Thus, the magnetic leakage flux affecting the VCM 28 is reduced, and a purpose of the SFF HDD to be made light is achieved. The magnetic leakage flux reducer 50 will now be described in more detail.

The magnetic leakage flux reducer 50 may be formed of steel or a steel-based material, and not a nonferrous material of which the cover 30 is to be formed. In other words, the magnetic leakage flux reducer 50 may be formed of a SPCE (Cold Rolled Steel) or a SUS material.

Since the magnetic leakage flux reducer 50 reduces the magnetic leakage flux affecting the VCM 28, the magnetic leakage flux reducer 50 may be immediately adjacent to the VCM 28, i.e., may be installed on an upper surface of the VCM 28.

The upper surface of the VCM 28 refers to an upper surface of the upper motor casing 28d shown in FIG. 2.

As shown in FIG. 2, the upper surface of the upper motor casing 28d is flat. Thus, in the present embodiment, the magnetic leakage flux reducer 50 is a laminated plate which is formed of a steel-based material.

Also, the magnetic leakage flux reducer 50 is substantially formed in the same shape as the upper surface of the VCM 28, i.e., the upper surface of the upper motor casing 28d.

For reference, the VCM 28 is schematically illustrated in FIG. 1. Therefore, the magnetic leakage flux reducer 50 is also schematically illustrated in FIG. 1. If the shape of the magnetic leakage flux reducer 50 is substantially equal to that of the upper surface of the upper motor casing 28d, the magnetic leakage flux reducer 50 may have a shape as shown in FIG. 2.

However, the present invention is not limited thereto, and thus the shape of the magnetic leakage flux reducer 50 is not necessarily the same as that of the upper surface of the VCM 28. The magnetic leakage flux reducer 50 may have a shape enough to be combined with the upper surface of the VCM 28 so as to control a magnetic flux leaked to the upper surface of the VCM 28.

In the present embodiment, the magnetic leakage flux reducer 50 is formed of the steel-based material into the laminated plate and stacked on the upper surface of the upper motor casing 28d in order to reduce the magnetic leakage flux, which affects the VCM 28, in a corresponding position.

Here, the magnetic leakage flux reducer 50 stacked on the upper surface of the upper motor casing 28d should not be detached from the upper motor casing 28d due to vibrations, etc. Thus, the magnetic leakage flux reducer 50 is adhered onto the upper surface of the upper motor casing 28d. Here, the adhesion of the magnetic leakage flux reducer 50 onto the upper surface of the upper motor casing 28d may be performed using an adhesive or a double-sided tape 50a as shown in FIG. 1.

However, if the magnetic leakage flux reducer 50 is combined with an inner surface of the cover 30 which is opposite to the upper surface of the upper motor casing 28d, a requirement of adhering the magnetic leakage flux reducer 50 may be omitted.

If the magnetic leakage flux reducer 50 is combined with the inner surface of the cover 30 as described above, the magnetic leakage flux reducer 50 may be adhered onto the inner surface of the cover 30 using an adhesive or a double-sided tape, or may form a single body along with the cover 30.

In the former case, the cover 30 may be formed using a pressing method. In the latter case, the cover 30 may be formed using a double molding method.

For reference, the double molding method refers to a method of forming two different materials into a single body using two molds. If the double molding method is used, the magnetic leakage flux reducer 50 is formed in the first mold and then taken out of the first mold. Next, the magnetic leakage flux reducer 50 is moved into the second mold to be molded along with the cover 30.

Referring to FIG. 5, if the cover 30 is formed of the aluminum material not a steel-based material, a magnetic leakage flux is increased from 140 G to 860 G, i.e., to 6 or more times. The magnetic leakage flux sufficient enough to affect the VCM 28 and locking and/or unlocking functions of the latch 31 which supports the HSA 24.

However, in the present embodiment, the cover 30 is formed of the aluminum material, and the magnetic leakage flux reducer 50 is provided on the upper surface of the VCM 28. Thus, the magnetic leakage flux may be reduced by about 2 or more times. For reference, it has been verified through testing during development of the present general inventive concept that a magnetic leakage flux of about 290 G as shown in FIG. 5 does not affect a 1.8-inch SFF HDD.

An operation of the HDD 10 having the above-described structure will now be described.

If power is applied to the HDD 10 to apply current to the voice coil 28a of the VCM 28, the actuator 26 pivots on the pivot shaft 26a. Thus, the magnetic head 25 lifts from the surface of the disk 22 to write data on and/or read data from the disk 22.

The magnetic leakage flux reducer 50 prevents the magnetic flux, which is generated from the VCM 28 during the writing and/or reading operations, from being leaked from the VCM 28. Therefore, an amount of the magnetic leakage flux is considerably reduced as previously described.

Next, if the power is cut off from the HDD 10 to stop rotating the disk 22, the magnetic head 25 becomes parked in the parking zone of the disk 22 or becomes positioned at the additional ramp to be completely parked.

As described above, a HDD according to the present general inventive concept includes a simple structure to be made light. Also, a magnetic leakage flux affecting a VCM is reduced.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A hard disk drive (HDD) comprising:
 a base comprising a voice coil motor (VCM) which drives an actuator;
 a cover combined with an upper surface of the base; and
 a magnetic leakage flux reducer adjacent to the VCM to reduce a magnetic leakage flux leaked from the VCM.

2. The HDD of claim 1, wherein the cover is formed of a nonferrous material.

3. The HDD of claim 2, wherein the cover is formed of an aluminum material.

4. The HDD of claim 1, wherein the magnetic leakage flux reducer is formed of a steel material, 5. The HDD of claim 1, wherein the VCM comprises:
 a bobbin which forms an end of a head stack assembly (HSA) pivoting on a pivot shaft and on which a voice coil is turned;
 a pair of magnets which are disposed under and above the bobbin so that the bobbin is positioned between the magnets, to have different magnetic poles so as to generate a magnetic field which interacts with an electric field generated by the VCM; and
 upper and lower motor casings which are combined with the magnets,
 wherein the magnetic leakage flux reducer is a laminate plate which is stacked on an upper surface of the upper motor casing.

6. The HDD of claim 5, wherein the magnetic leakage flux reducer is substantially formed in the same shape as the upper surface of the upper motor casing.

7. The HDD of claim 5, wherein the magnetic leakage flux reducer is adhered onto an upper surface of the VCM.

8. The HDD of claim 1, wherein the magnetic leakage flux reducer is combined with an inner surface of the cover.

9. The HDD of claim 8, wherein the magnetic leakage flux reducer is substantially formed in the same shape as the upper surface of the upper motor casing.

10. The HDD of claim 1, wherein the cover and the magnetic leakage flux reducer are formed into a single body using a double molding method.

11. The HDD of claim 1, wherein the HDD is a small form factor HDD (SFF HDD) having a diameter of 1.8 inch or less.

12. A hard disk drive (HDD) comprising:
 a base including a voice coil motor (VCM) which drives an actuator; and
 a cover connected to an upper surface of the base, the cover including a magnetic leakage flux reducer molded together with the cover at a position adjacent to the VCM to prevent a magnetic flux from leaking from the VCM.

13. The HDD of claim 12, wherein the VCM is substantially formed of the same shape as the upper surface of the VCM.

14. The HDD of claim 12, wherein the magnetic leakage flux reducer is molded in a first mold and then placed in a second mold to be molded again with molding of the cover.

15. The HDD of claim 14, wherein the magnetic leakage flux reducer is molded of a first material and the cover is molded of a second material different from the first material.

16. A hard disk drive (HDD) comprising:
 a base including a voice coil motor (VCM) which drives an actuator; and
 a cover connected to an upper surface of the base, the cover including a first material of light weight to connect with the base and a second material disposed at a position adjacent to the VCM to prevent a magnetic flux from leaking from the VCM.

* * * * *